(12) United States Patent
Goodman

(10) Patent No.: US 6,431,502 B1
(45) Date of Patent: Aug. 13, 2002

(54) CABLE CLAMP

(75) Inventor: William Max Goodman, Richmond, TX (US)

(73) Assignee: All-Points Equipment Co., L.P., Richmond, TX (US)

(*) Notice: Subject to any disclaimer, the term of this patent is extended or adjusted under 35 U.S.C. 154(b) by 0 days.

(21) Appl. No.: 09/523,765

(22) Filed: Mar. 11, 2000

(51) Int. Cl.[7] ................................................. F16L 1/26
(52) U.S. Cl. ..................... 248/74.1; 248/58; 248/61; 248/62; 248/65; 248/229.14; 403/309; 403/276
(58) Field of Search ............................. 248/229.14, 58, 248/61, 62, 74.1, 65; 403/309, 310, 351, 276, 280, 386, 391

(56) References Cited

U.S. PATENT DOCUMENTS 5,904,445 A  5/1999  Meuth ..................... 405/195.1
5,921,517 A  7/1999  Meuth ..................... 248/230.8

Primary Examiner—Leslie A. Braun
Assistant Examiner—Steven M. Marsh
(74) Attorney, Agent, or Firm—John R Casperson

(57) ABSTRACT

A clamp system is provided for clamping one tubular to another, such as control lines to a marine choke and kill riser line. The riser clamp comprises a saddle and U-bolt arrangement. The upper surface of the saddle defines a track configured to receive a shoe attached to either the control line clamp or an extension leg attached to the control line clamp. The control line clamp comprises an upper clamp half, a lower clamp half, a hinge pin connecting the halves, a fastener latching the halves, and a support leg having a shoe for receipt by either the saddle structure or the extension leg. The control line clamp preferably contains an elastomeric liner. The elastomeric liner is preferably provided in two halves. The inner surface of each liner half preferably is provided with a non-skid layer to more firmly position the control line.

16 Claims, 5 Drawing Sheets

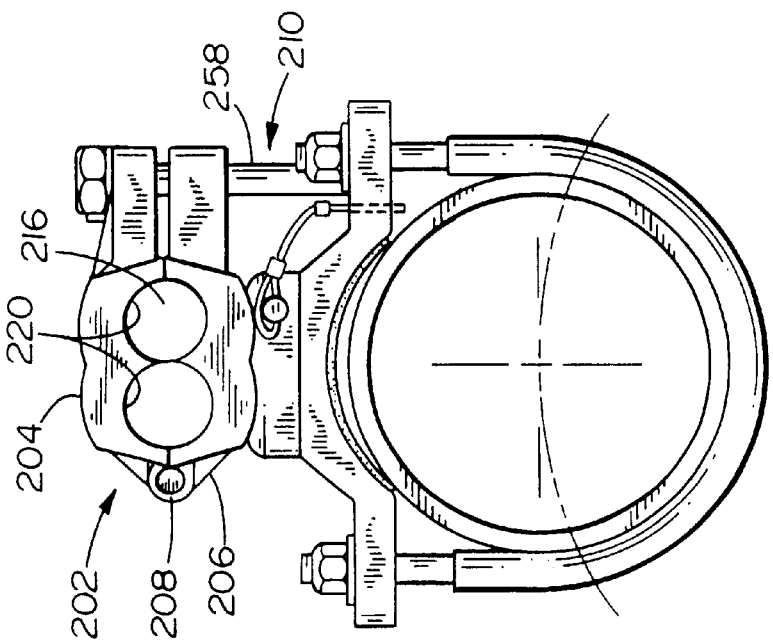
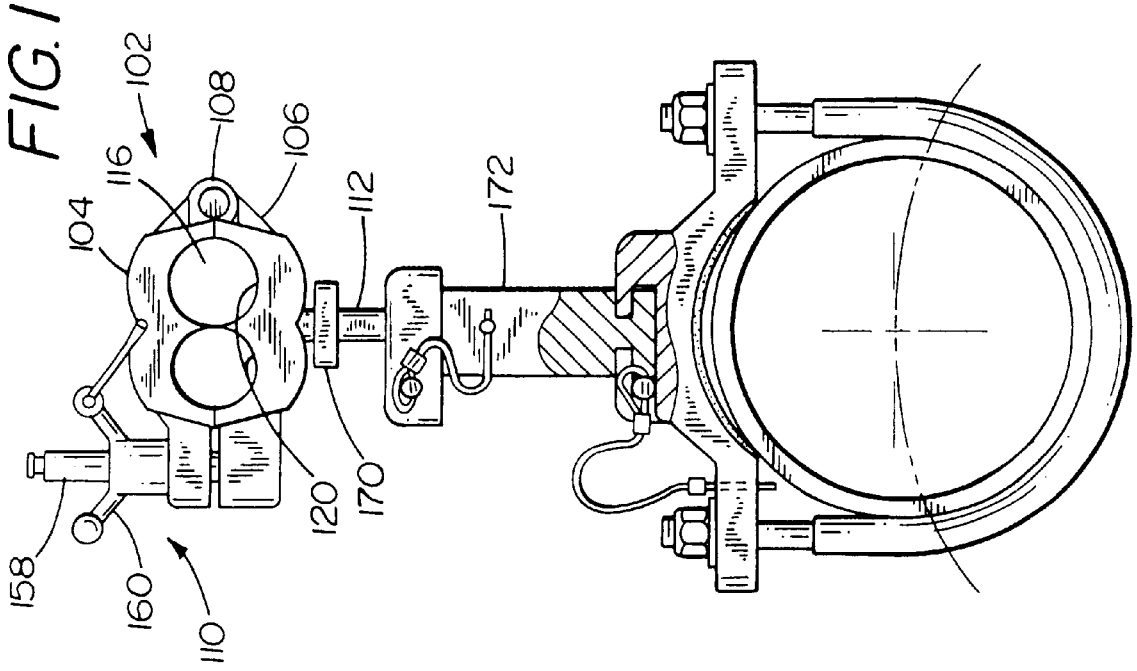

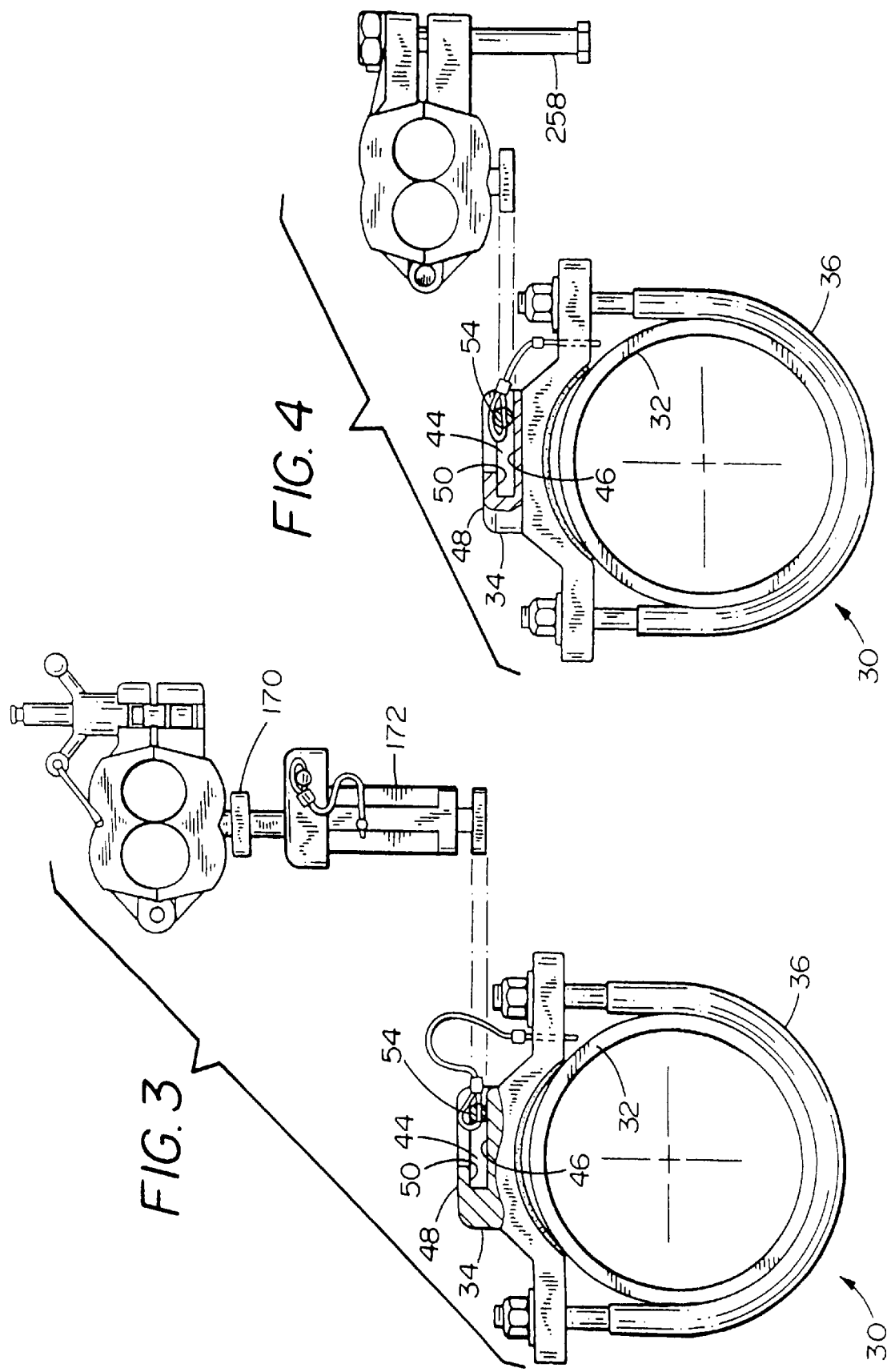

CABLE CLAMP

BACKGROUND OF THE INVENTION

1. Field of the Invention

The present invention relates generally to clamp assemblies for connecting one member to a support member. In a particularly preferred aspect, the invention relates to an ultra high strength clamp assembly to attach a pipe or line, such as an umbilical line, to another pipe. In a specific embodiment, the invention is particularly adapted for use as a subsea clamp assembly to attach an umbilical line to a choke or kill line of a subsea riser. In the specific embodiment the invention is particularly adapted for use as a variable height stand-off assembly to attach an umbilical line to a choke or kill line in a marine riser assembly.

2. Background of the Invention

The need often arises for a clamp assembly to attach a cable, hose or pipe to a support member or pipe. The situation often occurs where an umbilical line is required to be secured to a support member or pipe at a certain distance away from the support member, for example, to accommodate insulation, floatation and mechanical barriers.

In the offshore drilling and production industry, it is frequently necessary to run umbilical lines hundreds and even thousands of feet below the support vessel or drilling or production platform down to the sea floor and beyond. Typically, the umbilical lines, which may include electric, MUX (fiber optics), and hydraulics, are required to be attached to a support member, such as a choke or kill line, or mud line on a subsea riser system. Due to the high cost of working in such environments, it is critical that the clamp assembly be reliable and dependable to firmly secure the clamped members to prevent costly consequences, such as loss of signal in a fiber optic cable due to slack in an umbilical line which can create a sharp radius in the line preventing signal transmission. Various types of clamp assemblies and stand-off assemblies have been used in these situations. The prior art clamp assemblies and stand-off assemblies have been very costly and time consuming to make, use and install, and many do not clamp the umbilical lines with enough force.

SUMMARY OF THE INVENTION

In one embodiment of the invention, there is provided a base clamp for a tubular member which forms a mounting base for another clamp or an extension leg. The clamp comprises a saddle structure and at least one U-bolt. The saddle structure has a first end, a second end, an upper surface and a lower surface. The lower surface defines a trough extending from the first end to the second end for mounting the saddle structure to a tubular member. The saddle structure further defines at least one pair of parallel apertures positioned one on each side of the trough for receiving a first U-bolt for fastening the saddle structure to the tubular member. A U-bolt having a first end and a second end is received by the apertures and extends over the trough. The upper surface of the saddle structure defines a track configured to receive a shoe.

The track can connect the base clamp via a support leg to a line clamp according to another embodiment of the invention for a tubular hose or cable. The line clamp comprises an upper clamp half, a lower clamp half, a hinge pin connecting the halves, a fastener latching the halves, and a support leg having a shoe. The upper clamp half has a downwardly facing parting line face. The lower clamp half has an upwardly facing parting line face and is positioned in a face to face relationship with the upper clamp half so that the parting line faces are side by side. The hinge pin pivotally connects the clamp halves along a hinge edge. A fastener connects the clamp halves along a latch edge. The support leg extends from the lower clamp half and has an upper end attached to the lower clamp half and a lower end. The shoe is positioned on the lower end of the support leg.

Alternatively, the track can connect the base element to an extension leg according to another embodiment of the invention which can be used to connect the base clamp to the line clamp, or, if desired, to another extension leg. The extension leg has a first end and a second end and a longitudinal axis extending between the first end and the second end. A shoe is positioned on the first end of the extension leg. A track is positioned on the second end of the extension leg which is configured to receive the shoe.

Preferably, the line clamp employs an elastomeric liner according to another embodiment of the invention to reliably position the clamped line. The elastomeric liner is provided in two halves. Each liner half is formed from an elastomeric material and has an outside wall and an inside wall which defines at least one semi-cylindrical trough. The trough has a longitudinal axis, a first end, and a second end and is sized for closely receiving a hose or cable to be clamped. The outside wall is configured to be to be closely received by an inside surface of a clamp half.

BRIEF DESCRIPTION OF THE DRAWINGS

FIG. 1 is an end view, partly in cross section, of a clamp assembly according to one embodiment of the invention.

FIG. 2 is an end view, partly in cross section, of a clamp assembly according to another embodiment of the invention.

FIG. 3 is a partially exploded view of the assembly shown in FIG. 1.

FIG. 4 is a partially exploded view of the assembly shown in FIG. 2.

Figure 9:
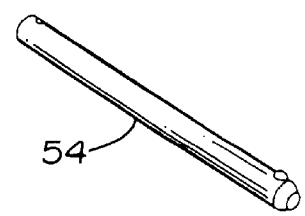

DETAILED DESCRIPTION OF THE INVENTION with reference to FIGS. 3–7 there is shown a base clamp 30 for a tubular member 32 which forms a mounting base for another clamp or an extension leg. The base clamp comprises a saddle structure 34 and at least one U-bolt 36. The saddle structure has a first end, a second end, an upper surface and a lower surface. The lower surface defines a trough 38 extending from the first end to the second end for mounting the saddle structure to tubular member 32. The saddle structure further defines at least one pair of parallel apertures 40, 41 positioned one on each side of the trough for receiving a first U-bolt for fastening the saddle structure to the tubular member. A U-bolt having a first end and a second end is received by the apertures and extends over the trough See FIGS. 3 and 4. The upper surface of the saddle structure defines a track 42 configured to receive a shoe The track forms a panel-shaped chamber 44 which is transversely positioned with respect to a radius drawn from a central section of the trough. The track has a track bottom surface 46 facing away from the trough and a roof structure 48 over the track bottom surface which defines a track top surface 50 which faces the track bottom surface and is spaced from the track bottom surface to accommodate the shoe. The roof structure having a slot 52 sized to accept a leg extending from the shoe. The panel shaped chamber and the slot together form an opening transverse to the longitudinal axis of the leg for transverse receipt of a shoe with attached leg. In use, a safety pin 54 (see also FIG. 9) is positioned across the opening to prevent a shoe with attached leg from becoming accidently dislodged. Preferably, the saddle structure defines a first pair and a second pair of parallel apertures. The first pair is positioned one on each side of the trough adjacent the first end of the saddle shaped structure for receiving the first U-bolt for fastening the saddle structure to the tubular member. The second pair is positioned one on each side of the trough adjacent the second end of the saddle shaped structure for receiving a second U-bolt 37 for fastening the saddle structure to the tubular member. See FIG. 5. The first U-bolt has a first end and a second end which are received by the first pair of apertures. The second U-bolt likewise has a first end, a second end, is received by the second pair of apertures, and extends over the trough. The saddle structure also preferably further defines a port 56 to permit unobstructed passage of a fastener bolt 58 (see FIG. 4) therethrough positioned between an aperture of the first pair and an aperture of the second pair.

The track 42 can connect the base clamp 30 via a support leg to a line clamp according to another embodiment of the invention for a tubular hose or cable. The line clamps illustrated in the Figures are variations of each other and will be described with different reference numerals. The line clamp shown in FIG. 1 will be described with 100 series numerals, while the line clamp shown in FIG. 2 will be described with 200 series numerals.

With reference to FIGS. 1 and 2, the line clamp 102, 202 comprises an upper clamp half 104, 204, a lower clamp half 106, 206, a hinge pin 108, 208 connecting the halves, a fastener 110, 210 latching the halves, and a support leg 112, 212 having a shoe 114, 214 (See FIGS. 10–13). The upper clamp half has a downwardly facing parting line face. The lower clamp half has an upwardly facing parting line face and is positioned in a face to face relationship with the upper clamp half so that the parting line faces are side by side. The hinge pin pivotally connects the clamp halves along a hinge edge. The fastener connects the clamp halves along a latch edge. The support leg extends from the lower clamp half and has an upper end attached to the lower clamp half and a lower end. The shoe is positioned on the lower end of the support leg.

Figure 6:
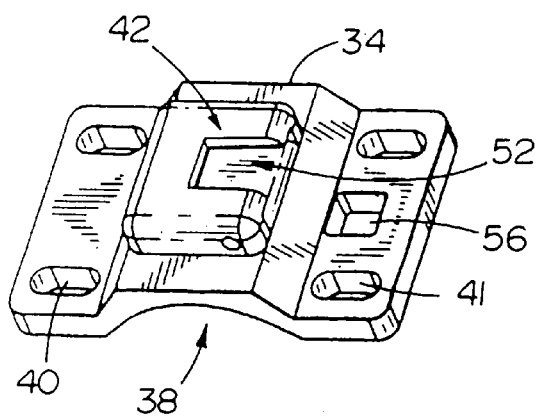
FIGS. 6–18 are pictorial representations of certain components of the devices shown in FIGS. 1 and 2.
Figure 7:
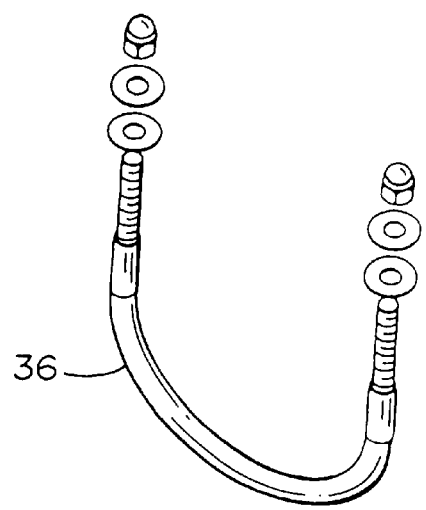
Figure 5:
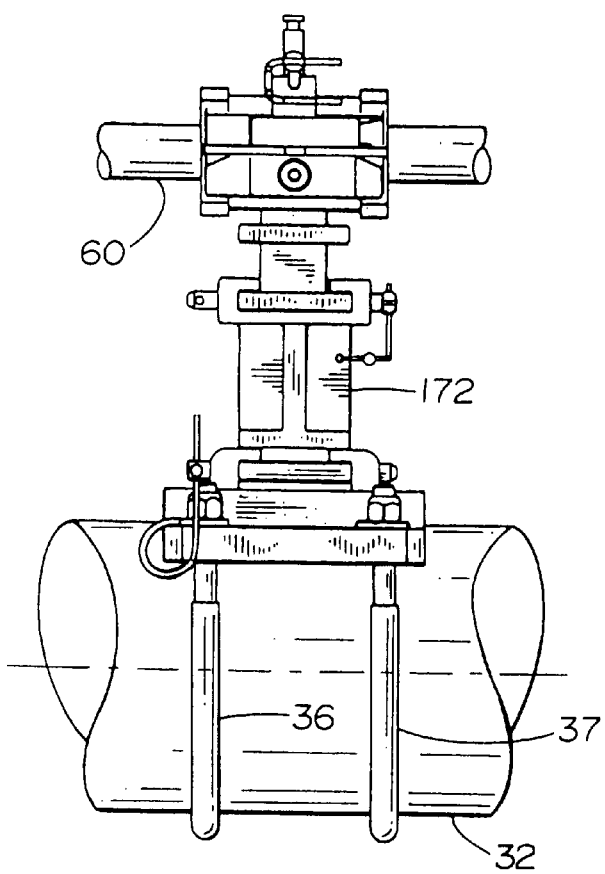
FIG. 5 is a side view of the invention shown in FIG. 1.

The clamp halves, when positioned in a face to face relationship, form a clamp assembly which defines at least one passage 116, 216 therethrough for clamping a cylindrical object, such as line 60 shown in FIG. 5. The passage has a longitudinal axis and the clamp assembly parts along a parting plane which encompasses the longitudinal axis. The support leg has a longitudinal axis which extends normally to the parting plane. See FIGS. 1 and 2.

In a preferred embodiment, the clamp assembly defines a pair of passages extending therethrough in side-by-side relationship. Even more preferred, an elastomeric liner 120, 220 lines each of the passages which extend though the clamp assembly 102, 202.

Figure 18:
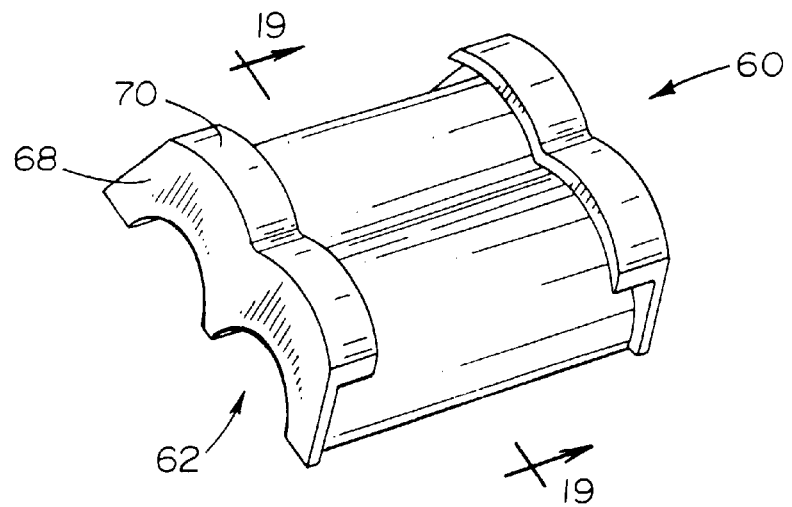
Figure 19:
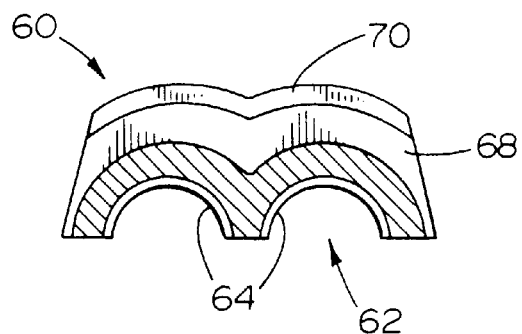
FIG. 19 is a cross sectional view of the component shown in FIG. 18 taken along lines 19—19.
Figure 20:
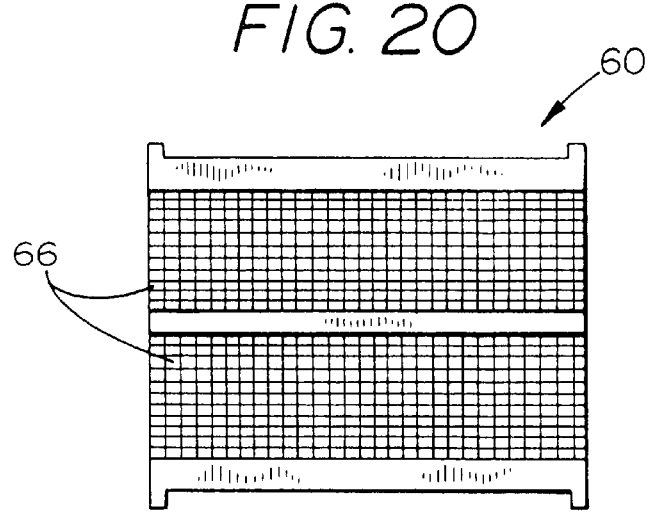
FIG. 20 is a bottom view of the device shown in FIG. 18.

Preferably, each elastomeric liner comprises a pair of liner halves 60 (see FIGS. 18–20) positioned in face to face relationship. Each liner half defining at least one trough 62.

One liner half is positioned in each clamp half. Each passage through the clamp assembly is defined by a pair of facing troughs from facing liner halves. In a preferred embodiment, each trough is semicylindrically shaped. A layer 64 of an anti-skid material positioned in each of the semi-cylindrical troughs. Most preferably, the layer of anti-skid material comprises a screen 66 which is coated with abrasive particles.

In order that the liner resist dislodging during handling and use, it is preferably provided with a flange 68 on each end. Each of the flanges preferably has a lip 70 which extends toward the opposite flange and retains the liner half in position on the clamp half.

Where a low profile is not needed, the preferred assembly employs a fastener as shown in FIG. 1. The fastener comprises a bolt 158 which extends upwardly and has a wing-nut 160 attached. The head of the bolt is attached to a portion of the lower clamp half and the shaft of the bolt extends through a portion of the upper clamp half and protrudes upwardly.

Where a low (or lower) profile is desired, an assembly employing a profile as shown in FIG. 2 can be used. The fastener comprises a bolt 258 having a head which contacts a portion of the upper clamp half and a shaft attached to the head which extends through a portion of the lower clamp half and protrudes downwardly. A port is preferably provided in the base as previously discussed to permit passage of the bolt.

Figure 8:
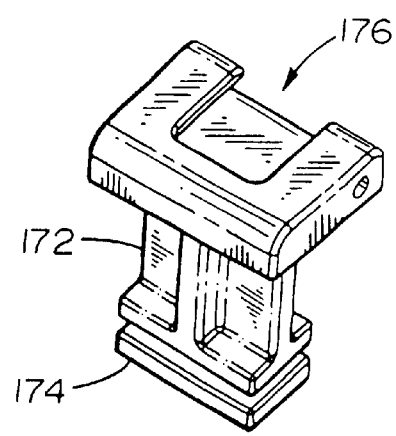
Figure 10:
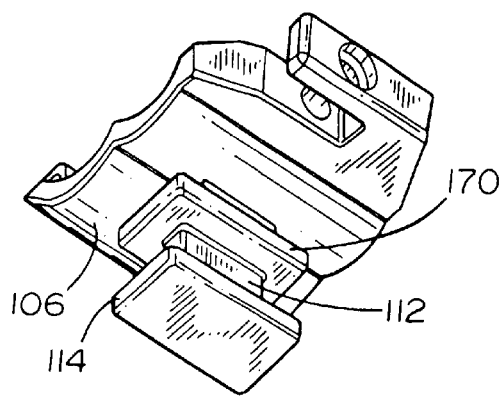
Figure 11:
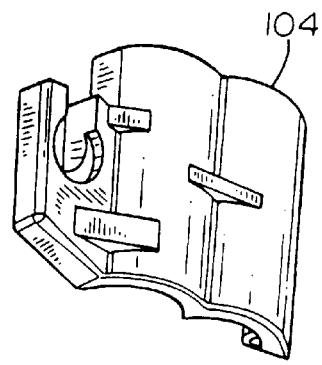
Figure 12:
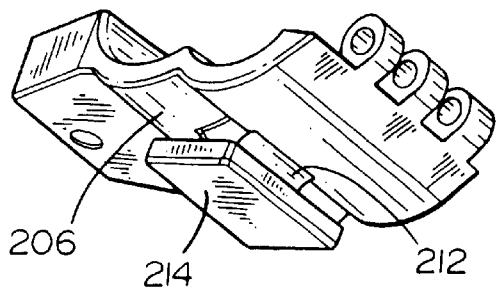
Figure 13:
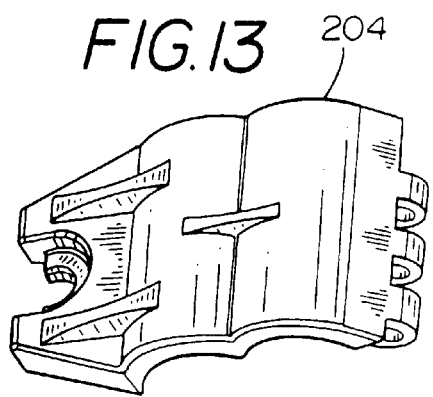
Figure 14:
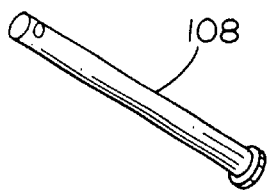
Figure 15:
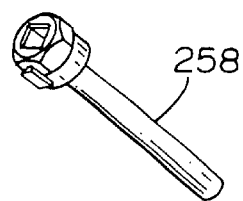
Figure 16:
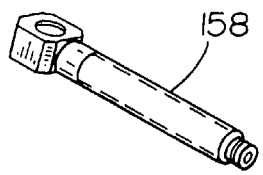
Figure 17:
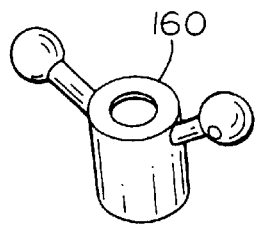

As shown in FIGS. 1, 3 and 10, a flange 170 can be positioned on the support leg between the upper end and the lower end of the support leg which is of the same shape as the shoe. This permits the length of the leg to be easily modified, in the field if necessary. If a longer leg is necessary, the track on the base clamp can connect the base element to an extension leg 172. See FIG. 8. The extension leg has a first end and a second end and a longitudinal axis extending between the first end and the second end. A shoe 174 is positioned on the first end of the extension leg. A track 176 is positioned on the second end of the extension leg which is configured to receive the shoe.

The shoe is panel-shaped and extends transversely to the longitudinal axis of the leg. The track forms a panel-shaped chamber, preferably identical in configuration to the chamber in the saddle structure, which is transversely positioned with respect to the longitudinal axis of the leg. The shoe has an upper shoe surface facing the leg and a lower shoe surface which faces away from the leg. The track has a track bottom surface facing away from the leg and is configured to fully support the lower shoe surface of the shoe. The track has a roof structure over the track bottom surface which defines a track top surface which faces the track bottom surface and is spaced from the track bottom surface so to contact the upper shoe surface and closely position the lower shoe surface of the shoe against the track bottom surface. The roof structure has a slot sized to accept the leg. The panel shaped chamber and the slot together form an opening transverse to the longitudinal axis of the leg for receipt of a shoe and leg. A safety pin, which can be the same as the pin 54, is preferably positioned across the opening to prevent the shoe and leg from becoming accidently dislodged.

Certain aspects of the liner have been previously discussed. The lips on the liner end flanges combined with its elastomeric construction permit the liner to be snapped onto a clamp half to facilitate handling and reduce the likelihood of accidental dislodging. The anti-skid material can be positioned with a layer of adhesive material positioned between the elastomeric liner half and the layer of anti-skid material, preferably a water-proof adhesive. Suitable anti-skid material is commercially available as sanding screen and can be purchased in rolls. A coarse plastic pipe sanding screen has been used with good results. Such screen is waterproof washable, has an open mesh backing, and is coated with abrasive on both sides. The coated abrasive comprises sharp silicon carbide particles.

The elastomer generally has a durometer of between about 70 and 130, preferably a durometer of between about 85 and about 105. Nitrile rubber having a durometer of about 95 has been used with good results. In the illustrated embodiment, the outside wall of the liner half defines half of a side-by-side tubular surface. The inside wall of the liner half defines flats for abutting corresponding flats on an inside wall of an opposed liner half The illustrated and described clamps have consistently provided a clamping force of over 2500 pounds.

While certain preferred embodiments of the invention have been described herein, the invention is not to be construed as being so limited, except to the extent that such limitations are found in the claims.

What is claimed is:

1. An elastomeric liner half for a hinged hose clamp or cable clamp, said liner half being formed from an elastomeric material and defining an inside wall defining at least one semicylindrical trough having a longitudinal axis, a first end, and a second end, said semicylindrical trough being for closely receiving a hose or cable to be clamped, and an outside wall to be closely received by an inside surface of a clamp half, said liner half having a first flange extending away from the longitudinal axis at the first end and a second flange extending away from the longitudinal axis at the second end for extending around a first end surface and a second end surface of a clamp half, said elastomeric liner half further having a first lip element positioned on the periphery of the first flange and extending over the outside wall and a second lip element positioned on the periphery of the second flange and extending over the outside wall so that the liner element can be snapped onto the clamp half.

2. A liner half as in claim 1 further comprising a layer of an anti-skid material positioned in the semi-cylindrical trough.

3. A liner half as in claim 2 further comprising a layer of adhesive material positioned between the elastomeric liner half and the layer of anti-skid material.

4. A liner half as in claim 3 wherein the anti-skid material comprises a sanding screen.

5. A liner half as in claim 4 wherein the sanding screen comprises a coarse plastic pipe sanding screen.

6. A liner half as in claim 5 wherein the sanding screen is waterproof, washable, has an open mesh backing, and is coated with abrasive on both sides.

7. A liner half as in claim 6 wherein the coated abrasive comprises sharp silicon carbide particles.

8. A liner half as in claim 7 wherein the elastomer has a durometer of between about 70 and 130.

9. A liner half as in claim 8 wherein the elastomer has a durometer of between about 85 and about 105.

10. A liner half as in claim 9 wherein the elastomer comprises nitrile rubber.

11. A liner half as in claim 1 wherein the inside wall of the liner half defines a pair of parallel semi-cylindrical troughs.

12. A liner half as in claim 11 wherein the outside wall of the liner half defines half of a side-by-side tubular surface.

13. A liner half as in claim 11 wherein the inside wall of the liner half defines flats for abutting corresponding flats on an inside wall of an opposed liner half.

14. A clamp for a tubular hose or cable, said clamp comprising
an upper clamp half having a downwardly facing parting line face;
a lower clamp half having an upwardly facing parting line face, said lower clamp half being positioned in a face to face relationship with the upper clamp half so that the parting line faces are side by side;
a hinge pin pivotally connecting the clamp halves along a hinge edge,
a fastener connecting the clamp halves along a latch edge;
a support leg extending from the lower clamp half, said support leg having an upper end attached to the lower clamp half and a lower end; and
a shoe positioned on the lower end of the support leg,
wherein the clamp halves, when positioned in a face to face relationship, form a clamp assembly which defines at least one passage therethrough for clamping a cylindrical object, wherein said passage has a longitudinal axis and wherein the clamp assembly parts along a parting plane which encompasses the longitudinal axis, and wherein the support leg has a longitudinal axis which extends normally to the parting plane,
said clamp further comprising an elastomeric liner which lines each of the passages which extend though the clamp assembly for clamping a cylindrical object
said elastomeric liner further defining at least one semi-cylindrical trough for receiving the cylindrical object to be clamped and a layer of an anti-skid material positioned in each semicylindrical trough.

15. A clamp for a tubular hose or cable, said clamp comprising
an upper clamp half having a downwardly facing parting line face;
a lower clamp half having an upwardly facing parting line face, said lower clamp half being positioned in a face to face relationship with the upper clamp half so that the parting line faces are side by side;
a hinge pin pivotally connecting the clamp halves along a hinge edge,
a fastener connecting the clamp halves along a latch edge;
a support leg extending from the lower clamp half, said support leg having an upper end attached to the lower clamp half and a lower end; and
a shoe positioned on the lower end of the support leg,
wherein the clamp halves, when positioned in a face to face relationship, form a clamp assembly which defines at least one passage therethrough for clamping a cylindrical object, wherein said passage has a longitudinal axis and wherein the clamp assembly parts along a parting plane which encompasses the longitudinal axis, and wherein the support leg has a longitudinal axis which extends normally to the parting plane,
said clamp further comprising an elastomeric liner which lines each of the passages which extend though the clamp assembly for clamping a cylindrical object
said elastomeric liner further defining at least one semi-cylindrical trough for receiving the cylindrical object to be clamped and a layer of an anti-skid material positioned in each semi-cylindrical trough;
wherein the clamp assembly defines a pair of passages extending therethrough in side-by-side relationship, said clamp further comprising a flange positioned on the support leg between the upper end and the lower end of the support leg which is of the same shape as the shoe.

16. Apparatus comprising an extension leg having a first end and a second end and a longitudinal axis extending between the first end and the second end, a shoe positioned on the first end of the leg, and a track positioned on the second end of the extension leg configured to receive the shoe, a clamp for a tubular hose or cable, said clamp comprising
an upper clamp half having a downwardly facing parting line face,
a lower clamp half having upwardly an upwardly facing parting line face, said lower clamp half being positioned in a face to face relationship with the upper clamp half so that the parting line faces are side by side,
a hinge pin pivotally connecting the clamp halves along a hinge edge,
a fastener connecting the clamp halves along a latch edge,
a support leg extending from the lower clamp half, said support leg having an upper end attached to the lower clamp half and a lower end, and
a shoe positioned on the lower end of the support leg, wherein the shoe positioned on the lower end of the support leg is received by the track positioned on the second end of the extension leg, and a clamp for a tubular member comprising
a saddle structure having a first end and a second end, an upper surface and a lower surface, wherein the lower surface defines a trough extending from the first end to the second end for mounting the saddle structure to a tubular member, and at least one pair of parallel apertures positioned one on each side of the trough for receiving a first U-bolt for fastening the saddle structure to the tubular member, and
a first U-bolt having a first end and a second end which are received by the apertures, said U-bolt extending over the trough,
wherein the upper surface of the saddle structure defines a track configured to receive a shoe, wherein the shoe positioned on the first end of the extension leg is received in the track on the upper surface of the saddle structure.

* * * * *